R. T. & W. R. SIMMONS.
COTTON CULTIVATING MACHINE.
APPLICATION FILED NOV. 27, 1912.

1,079,671.

Patented Nov. 25, 1913.

2 SHEETS—SHEET 1.

Robert T. Simmons &
William R. Simmons,
Inventors, by C. A. Snow & Co.
Attorneys R. T. & W. R. SIMMONS.
COTTON CULTIVATING MACHINE.
APPLICATION FILED NOV. 27, 1912.

1,079,671.

Patented Nov. 25, 1913.

2 SHEETS—SHEET 2.

Robert T. Simmons,
William R. Simmons,
Inventors,

Witnesses by C. A. Snow & Co.
Attorneys

UNITED STATES PATENT OFFICE.

ROBERT TOLIVER SIMMONS AND WILLIAM R. SIMMONS, OF WYNNE, ARKANSAS.

COTTON-CULTIVATING MACHINE.

1,079,671.   Specification of Letters Patent.   Patented Nov. 25, 1913.

Application filed November 27, 1912. Serial No. 733,855.

*To all whom it may concern:*

Be it known that we, ROBERT T. SIMMONS and WILLIAM R. SIMMONS, citizens of the United States, residing at Wynne, in the county of Cross, State of Arkansas, have invented a new and useful Cotton-Cultivating Machine, of which the following is a specification.

This invention relates to an attachment for use primarily in the cultivation of cotton, one of the objects of the invention being to provide an attachment of this character which can be applied readily to different types of wheel cultivators, the said attachment including novel means for weeding the soil and for chopping cotton plants.

Another object is to provide simple means under the control of the operator whereby the operation of the chopping and weeding mechanism can be controlled.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings the preferred form of the invention has been shown.

Figure 1:
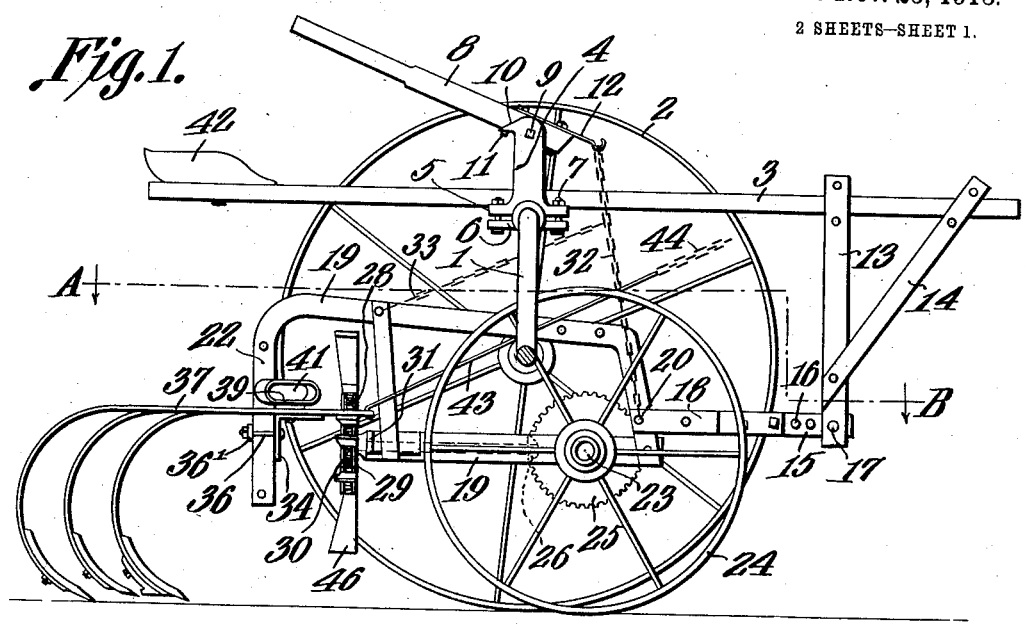
Figure 2:
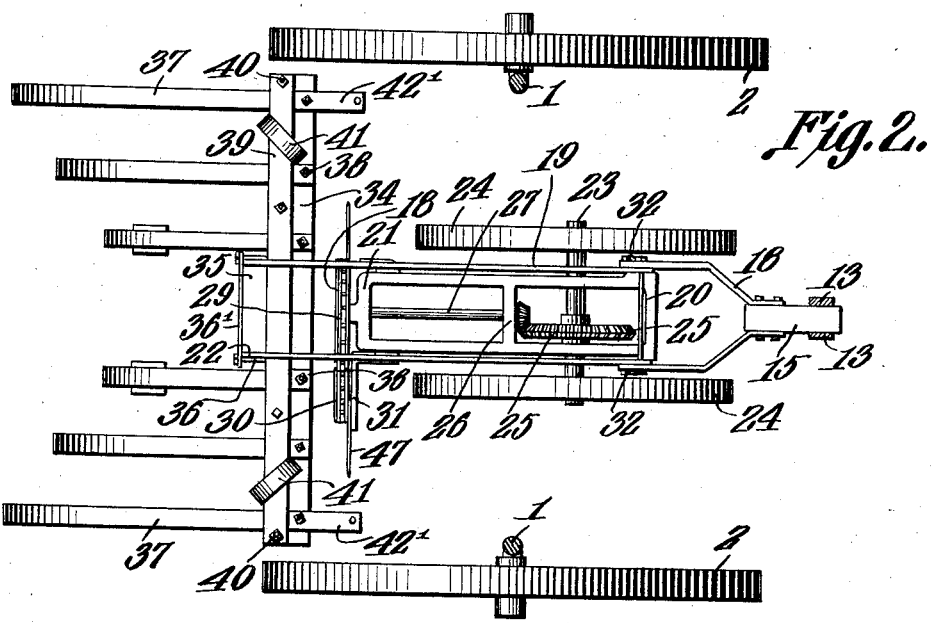
Figure 3:
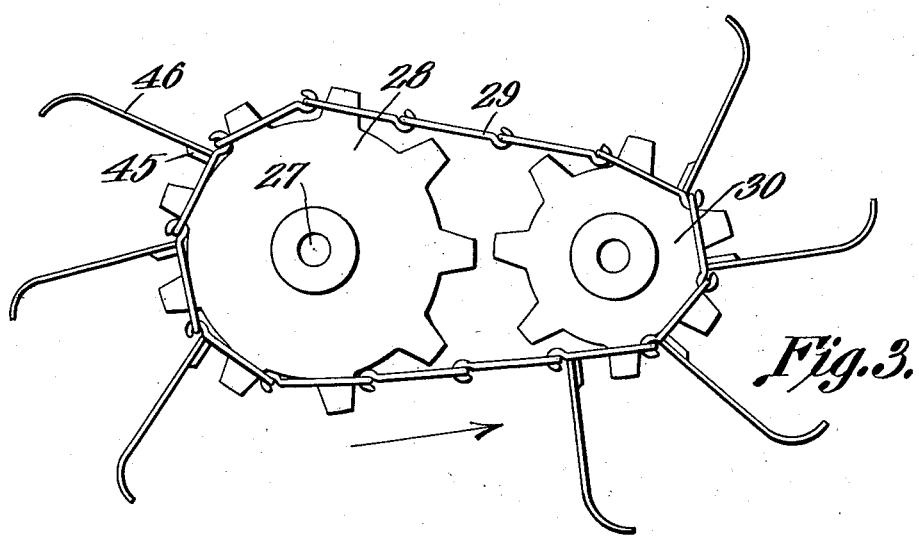
Figure 5:
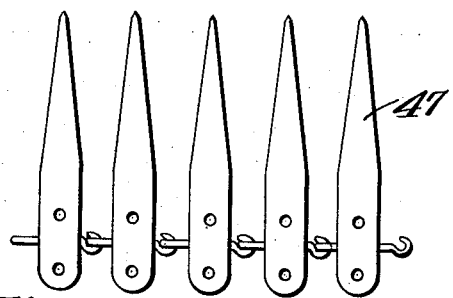
Figure 4:
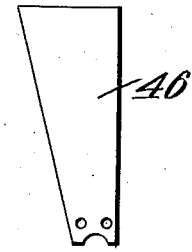

In said drawings:—Figure 1 is a side elevation of a cultivator having the present improvements combined therewith, the axle of the cultivator being shown in section. Fig. 2 is a section on line A—B Fig. 1. Fig. 3 is a rear elevation of the cotton chopping device. Fig. 4 is a detail view of one of the chopping blades. Fig. 5 is a side elevation of a modified structure for use in weeding.

Referring to the figures by characters of reference 1 designates the arched axle, 2 the supporting wheels and 3 the beam of an ordinary cultivator.

Mounted on the arched axle 1 is a standard 4 the base of which is shaped to fit snugly on the axle and has laterally extending ears 5. A clamping plate 6 extends under the axle and under the ears 5 and is connected to said ears by means of bolts 7 or the like. A lever 8 is fulcrumed, as at 9 upon the standard 4 and extending rearwardly from the standard is a nose 10 adapted to be engaged by a projection 11 extending laterally from the lever 8. A hooked tongue 12 extends from the front end of lever 8 and is for the purpose hereinafter set forth.

Clamped or otherwise secured to the beam 3 is a hanger 13 provided with a brace 14 likewise clamped or otherwise secured to the beam. Pivotally connected to the lower end portion of the hanger 13 is a tongue 15 having a plurality of apertures 16, any one of which is adapted to receive the pivot bolt 17. This tongue, 15, is secured between and extends forwardly from the side members of a yoke 18, this yoke straddling the frame members 19 of the attachment and being pivotally connected to them by a cross bolt 20 or the like. These side frame members are connected to the sides of the main frame 21 of the attachment and extend upwardly and rearwardly therebeyond, the rear ends of the side frame members 19 being extended downwardly to form hangers 22 located back of and spaced from the main frame 21 of the attachment. An axle 23 is mounted for rotation in the main frame 21 and is supported by wheels 24 adapted to travel over the ground. These wheels constitute means for rotating the axle and a gear 25 is secured to and rotates with the axle and meshes with a smaller gear 26 located at the front end of a longitudinal shaft 27 journaled in the frame 21. Secured to that end of the shaft 27 back of the frame 21 is a sprocket 28 on which is mounted an endless chain 29, this chain extending around a smaller sprocket 30 which is supported by a laterally extending bracket 31 mounted on one side of the main frame 21 of the attachment.

Lifting chains 32 extend downwardly from the hooked tongue 12 to the front end portions of the side frame members 19 and additional chains 33 may be extended from the rear portions of said side frame members 19 and forwardly and upwardly to the chains 32.

The downwardly extending rear end portions 22 of the side frame members 19 extend back of an angle strip 34 and placed back of this angle strip and between the downwardly extending portions 22 is a filling block 35 preferably of wood. A clamping plate 36′ extends along the back face of the filling block and across the back edges of the portions 22 and is connected to the angle strip 34 by bolts 36.

Bearing downwardly on the angle strip 34 and beyond the sides of the frame members 19 are spring teeth 37 fastened to the angle strip in any suitable manner, as by means of bolts 38. A clamping strip 39 extends transversely over the teeth 37 and is bolted as at 40 to the strip 34, this clamping strip 39 being provided with stirrups 41 adapted to receive the feet of the person occupying the seat 42 mounted on beam 3. With this arrangement of parts it will be seen that the teeth 37 can be adjusted upwardly and downwardly along the portions 22 of the side frame members 19, this adjustment being effected by loosening bolts 36 so as to permit the strip 34, to be slid along the portions 22 of the side frame members and the filling block 35. This block is fixedly mounted. Certain of the teeth 37 have tongues 42' extending forwardly therefrom and adapted to be engaged by rods 43 such as found in most cultivators and which are utilized in regulating the depth of the furrows. As this rod 43 and its chain connection 44 does not constitute a part of the present invention, it is not deemed necessary to specifically show and describe it.

When the machine herein described is to be used for chopping cotton, certain of the links of the chain 29 are provided with outstanding transverse lugs 45 to which are secured the inner or butt ends of chopping blades 46. As shown in Fig. 4, each chopping blade has its side edges preferably diverging outwardly, the outer end portion of each blade being curved, as shown particularly in Fig. 3. These blades can be placed at any desired intervals apart and it will be apparent that, as the machine is moved forward, the wheels 24, by reason of their contacting with the ground, will rotate and cause the gear 25 to revolve with them. Thus motion will be transmitted through gear 26 and shaft 27 to sprocket 28 and the chain 29 will be actuated in the direction indicated by the arrow in Fig. 3. As the attachment is designed to straddle the row of cotton or other plants being acted on, the blades 46 will be moved transversely of the row and will cut therefrom any plants in the paths thereof. By utilizing chains which are provided with blades 46 at certain intervals it will be seen that, during the operation of the machine, certain of the plants will be skipped and thus left standing. Should it be desired to use the machine for weeding, blades such as shown at 47 in Fig. 5 are substituted for the blades 46, these teeth or blades 47 being preferably pointed as shown and being attached to one side of the chain. Each link of the chain is provided with one of the teeth or blades so that, as the machine moves along, the blades will cut transversely among the weeds and cause them to be raked out of the soil immediately subsequent to the cutting operation. In other words, those of the teeth 47 extending downwardly coöperate to form both a rake and a laterally movable cutting means.

It is to be understood of course that if desired the teeth 37 can be used either independently of or in connection with the transversely movable soil engaging devices for cultivating the soil.

By shifting lever 8 laterally so as to remove projection 11 from under the nose 10, the tongue 12 is left free to swing downwardly, thus to permit the attachment to move downwardly relative to the cultivator. By pulling downwardly onto the handle end of lever 8 and shifting said lever laterally to bring the projection 11 into engagement with nose 10, the parts are held raised or in inactive positions. Obviously the chains 32 and 33 can be adjusted relative to each other and to the tongue 12 simply by hooking different links into the tongue 12 and by placing different links of the two chains into engagement with each other.

What is claimed is:—

The combination with a cultivator including a wheel supported axle, of an attachment under the axle and including a wheel supported frame, side frame members connected thereto and having downwardly extending rear portions, an angle strip adjustable vertically along said portions, means for clamping the strip upon said portions to hold it against movement, soil engaging teeth secured to and extending rearwardly from said strip, a chopping means supported by the frame and in front of said strip, and means operated by one of the supporting wheels for actuating the chopping means during the forward movement of the wheel.

In testimony that we claim the foregoing as our own, we have hereto affixed our signatures in the presence of two witnesses.

ROBERT TOLIVER SIMMONS.
WILLIAM R. SIMMONS.

Witnesses:
  B. M. SMITH,
  BEN BLOCK.

---

Copies of this patent may be obtained for five cents each, by addressing the "Commissioner of Patents, Washington, D. C."